C. W. MANZEL.
LEAF SPRING LUBRICATING TOOL.
APPLICATION FILED NOV. 11, 1915.

1,201,324.

Patented Oct. 17, 1916.

INVENTOR
Charles W. Manzel,
by Geyer & Popp
ATTORNEYS.

UNITED STATES PATENT OFFICE.

CHARLES W. MANZEL, OF BUFFALO, NEW YORK.

LEAF-SPRING-LUBRICATING TOOL.

1,201,324. Specification of Letters Patent. Patented Oct. 17, 1916.

Application filed November 11, 1915. Serial No. 60,877.

*To all whom it may concern:*

Be it known that I, CHARLES W. MANZEL, a citizen of the United States, residing at Buffalo, in the county of Erie and State of New York, have invented new and useful Improvements in Leaf-Spring-Lubricating Tools, of which the following is a specification.

This invention relates to a tool for spreading the leaves of vehicle springs and delivering a suitable lubricant between them, the device being more especially designed for lubricating the springs of automobiles.

The object of my invention is the production of a convenient, inexpensive and self-contained tool which combines the elements of a spreader and an injecting device for supplying the lubricant to the separated leaves, thus avoiding the expense and inconvenience of two separate appliances for this purpose.

Figure 1:
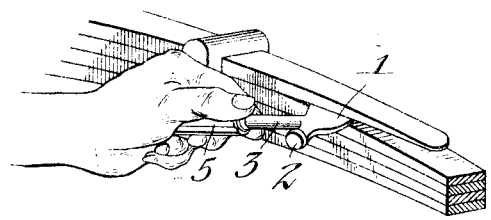
Figure 2:
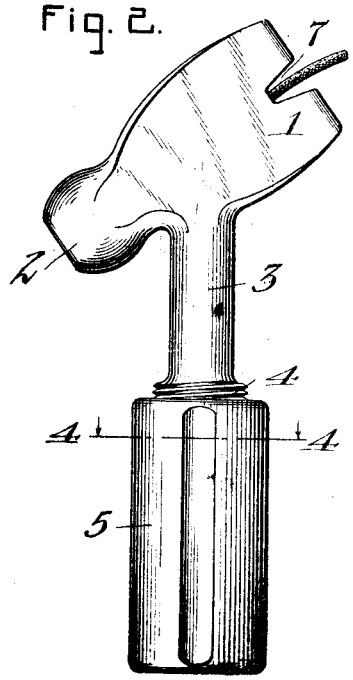
Figure 3:
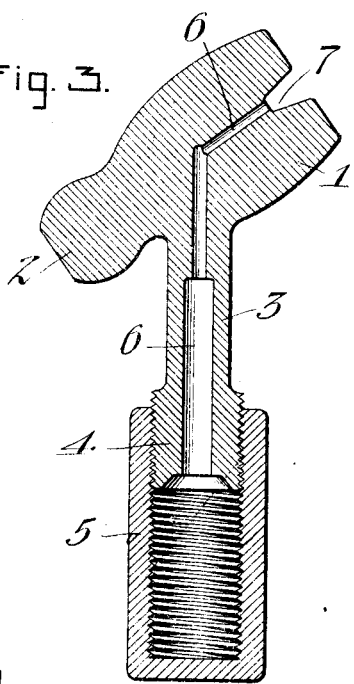
Figure 4:
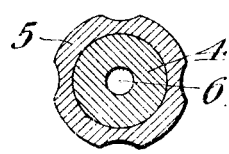
Figure 5:
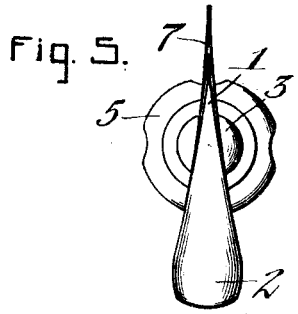

In the accompanying drawings: Figure 1 is a perspective view of the tool showing its wedge driven between the leaves of a spring, preparatory to lubricating them. Fig. 2 is a side elevation of the tool. Fig. 3 is a longitudinal section thereof. Fig. 4 is a cross section on line 4—4, Fig. 2. Fig. 5 is a top plan view of the tool.

Similar characters of reference indicate corresponding parts in the several views.

In the preferred embodiment of the tool illustrated in the drawings, it comprises a wedge or spreader 1 adapted to be driven between the leaves of a semi-elliptical or other leaf-spring for separating them, as shown in Fig. 1, the wedge being provided at its rear end with a head or enlargement 2 adapted to be struck by a hammer. Projecting from one side or edge of the wedge is a shank 3 having an externally screw-threaded lower portion 4 with which engages the internally-threaded upper portion of a hollow handle 5 which also serves as a lubricant chamber or receptacle. This receptacle or container is closed on all sides and at its outer or lower end, only its upper end being open to receive the screw-threaded portion of the shank 3. Extending through this shank and the body of the wedge 1 is a lubricant-passage or channel 6 which terminates at or adjacent to the front edge of the wedge. In the preferred construction shown in the drawings, the wedge is provided in its front edge with a central V-shaped notch or recess 7 and the lubricant passage opens into the apex of this recess.

The handle 5 may be screwed forwardly on the threaded shank 3 to expel the lubricant through the passage 6, the handle and shank thus forming practically a cylinder and piston.

In the use of the tool, the same is held by its handle and the wedge 1 is driven between the leaves to be lubricated by striking the head 2 of the wedge. After thus spreading the leaves, the handle is turned forwardly on the shank 3, thereby forcing a quantity of the lubricant through the passage 6 into the recess in the front edge of the wedge and delivering it between the leaves. In this manner, the several leaves of a spring can be quickly and conveniently lubricated.

The combined handle and cylinder 5 is readily filled with graphite, grease or other suitable lubricant, by unscrewing it from the stem 3.

As shown in the drawings, the wedge is preferably arranged obliquely to the shank 3 with its front portion at an obtuse angle thereto. This construction enables the wedge to be conveniently driven and leaves ample room for the user's hand between the handle and the spring.

The wedge and its shank may be forged of steel, while the handle 5 may be cast of any suitable metal.

While combining the functions of a leaf-spreader and a lubricator in a single, self-contained tool, this device comprises but two parts, enabling it to be manufactured at low cost. The tool also has the advantage of being small and compact.

I claim as my invention:

1. A leaf-spring lubricating tool, comprising a wedge provided at its rear end with a driving-head and having a lubricant-passage adjacent to its front edge, a hollow shank projecting laterally from the wedge between its front edge and its driving head, the bore of the shank communicating with said lubricant-passage, and a lubricant-chamber mounted on said shank and communicating with the bore thereof, said chamber being movable relatively to the shank to expel the lubricant therefrom into the shank and said lubricant-passage.

2. A leaf-spring lubricating tool, comprising a wedge provided at its rear end with driving-head, the wedge having a lubricant passage adjacent to its front edge, a hollow shank projecting laterally from the wedge between its front edge and its driving head, the bore of the shank communicating with said lubricant passage, and a handle movable lengthwise on said shank and containing a lubricant chamber which communicates with the bore of the shank.

3. A leaf-spring lubricating tool, comprising a wedge adapted to be driven between the leaves of the spring and having a lubricant-passage adjacent to its front edge, a hollow shank projecting laterally from one of the side-edges of the wedge and having its bore in communication with said passage, the side of the shank which faces the front edge of the wedge being arranged at an obtuse angle to the wedge, and a movable handle mounted on said shank and containing a lubricant-chamber which communicates with the bore of the shank.

CHARLES W. MANZEL.